United States Patent [19]
Steiner et al.

[11] Patent Number: 5,990,457
[45] Date of Patent: Nov. 23, 1999

[54] GLASS-CERAMIC COOK TOP

[75] Inventors: Herbert Steiner, Traunstein; Manfred Edlmann, Schnaitsee; Rudolf Meierhofer, Altenmarkt, all of Germany

[73] Assignee: BSH Bosch und Siemens Hausgeraete GmbH, Munich, Germany

[21] Appl. No.: 09/104,740

[22] Filed: Jun. 25, 1998

Related U.S. Application Data

[62] Division of application No. 08/661,348, Jun. 14, 1996.

[30] Foreign Application Priority Data

Jun. 14, 1995 [DE] Germany ............................ 195 21 690

[51] Int. Cl.$^6$ ................. H05B 3/68; F24C 15/10
[52] U.S. Cl. .................. 219/452.11; 126/214 A
[58] Field of Search ..................... 219/455, 458, 219/459, 463, 464; 129/39 H, 39 N, 39 J, 211, 214 A

[56] References Cited

U.S. PATENT DOCUMENTS

| | | |
|---|---|---|
| 4,243,016 | 1/1981 | Kristen et al. . |
| 4,453,533 | 6/1984 | Scheidler et al. . |
| 4,492,217 | 1/1985 | Scheidler . |
| 4,960,978 | 10/1990 | Lorenz et al. . |
| 5,036,831 | 8/1991 | Ray ......................................... 219/464 |
| 5,530,224 | 6/1996 | Sassman . |
| 5,782,047 | 7/1998 | Bird et al. ................................ 219/464 |

FOREIGN PATENT DOCUMENTS 449347  2/1991  European Pat. Off. ............... 219/464

*Primary Examiner*—Teresa Walberg
*Assistant Examiner*—Sam Paik
*Attorney, Agent, or Firm*—Herbert L. Lerner; Laurence A. Greenberg

[57] ABSTRACT

A glass-ceramic cooktop includes a glass-ceramic plate having a periphery. At least one heating body is disposed below the glass-ceramic plate. A sprayed-on plastic frame embraces the periphery of the glass-ceramic plate and has an upper surface. A protective lining of high-temperature-proof material embraces the glass-ceramic plate and is disposed on the upper surface of the plastic frame.

2 Claims, 2 Drawing Sheets

GLASS-CERAMIC COOK TOP

This application is a divisional of Ser. No. 08/661,348 filed Jun. 14, 1996.

BACKGROUND OF THE INVENTION

1. Field of the Invention

The present invention relates to a glass-ceramic cooktop with a glass-ceramic plate, at least one heating body located beneath the glass-ceramic plate, and an injection molded plastic frame embracing the periphery of the glass-ceramic plate.

One such glass-ceramic plate is known from Published European Patent Application 0 449 347 A1, in which the plastic frame is firmly joined to the glass-ceramic plate to make a structural unit by injection molding. A disadvantage thereof is that when hot cooking pots are set down to rest on the plastic frame, the frame can be damaged or its appearance can be impaired.

SUMMARY OF THE INVENTION

It is accordingly an object of the invention to provide a glass-ceramic cooktop, which overcomes the hereinafore-mentioned disadvantages of the heretofore-known devices of this general type and which has an injection molded frame that withstands even extreme strains.

With the foregoing and other objects in view there is provided, in accordance with the invention, a glass-ceramic cooktop, comprising a glass-ceramic plate having a periphery; least one heating body below the glass-ceramic plate; an injection molded plastic frame embracing the periphery of the glass-ceramic plate and having an upper surface; and a protective lining of high-temperature-proof material embracing the glass-ceramic plate and being disposed on the upper surface of the plastic frame.

As a result, it is possible firstly to produce the plastic frame from economical material that is less temperature-resistant than the material of the protective lining. Secondly, the use of the high-temperature-proof material can be limited to a sufficiently thick layer. That, too, can make for significant savings when cost-intensive material is used for the protective lining. When a cooking pot is set down on the protective lining, the lining withstands the high temperatures that prevail there without damage and protects the plastic frame located beneath it.

In accordance with another feature of the invention, the protective lining substantially completely covers the upper surface of the plastic frame. This permits a larger region of contact between the protective lining and the plastic frame and thus better adhesion of the plastic lining. The complete coverage also assures optimal protection of the plastic frame, especially against radiant heat from the cooking pot set down on the protective lining. The complete coverage can also be simpler from a production standpoint and furnishes a flat frame surface that is free of sharp-edged bumps.

In accordance with a further feature of the invention, as an alternative, the protective lining covers only portions of the upper surface of the plastic frame and can also form only protective pan rest surfaces, protruding past these portions, on the plastic frame. As a result, with considerable savings of material for the protective lining, adequate protection for the plastic frame can nevertheless optionally be assured. The geometry of the protective pan rest surfaces and their spacing from one another is configured in such a way that direct contact of a cooking pot with the more-temperature-sensitive plastic frame is precluded.

In accordance with an added feature of the invention, the protective lining is formed of a high-temperature-proof plastic which is injection molded onto the glass-ceramic plate or plastic frame. As a result, the entire frame can be made with a single production technique, and it furnishes an especially liquid-tight frame enclosing the glass-ceramic plate.

In accordance with an additional feature of the invention, in order to make it more difficult for heat to be conducted through the protective lining to the plastic frame, the material of the plastic protective lining is poorly heat-conducting.

In accordance with yet another feature of the invention, as an alternative, the protective lining is formed of metal. Where good heat conducting properties of the metal protective lining are of less significance, in this version the problematic choice of material from among suitable plastics is of no consequence, at least with respect to the temperature properties.

In accordance with yet a further feature of the invention, the protective lining is constructed as a metal protective frame that is secured to the plastic frame, in particular by being slipped onto it. This has particular advantages from a recycling standpoint. Moreover, this additionally stabilizes the plastic frame.

In accordance with yet an added feature of the invention, the plastic frame encloses the peripheral region of the glass-ceramic plate on the top and bottom thereof. As a result, an optimal hold and good sealing between the plastic frame and the glass-ceramic plate are assured. Moreover, the plastic frame enclosing the glass-ceramic plate can provide overflow protection for liquid spilled onto the glass-ceramic plate. Moreover, in the case of a protective lining of high-temperature-proof plastic, costs can be lowered by essentially making the cooktop frame out of less temperature-resistant and more economical material.

In accordance with yet an additional feature of the invention, as an alternative, the protective lining encloses the peripheral region of the glass-ceramic plate on its top and bottom. Particularly when high-temperature-proof plastic is used, which is usually difficult to handle in injection molding, this can bring advantages in comparison with spraying a relatively thin layer of high-temperature-resistant plastic onto the actual plastic frame.

In accordance with again another feature of the invention, in both cases, the protective lining or the plastic frame fits over the peripheral region of the glass-ceramic plate by between approximately 1 and 10 mm and preferably 2 to 5 mm. Thus on one hand, due to the different coefficients of longitudinal expansion of the material of the frame and the material of the glass-ceramic plate under temperature stress, the required enclosure depth for securely enclosing the glass-ceramic plate can be provided. On the other hand, not too much flat pan rest area on the glass-ceramic plate is lost in the process.

In accordance with again a further feature of the invention, the plastic frame has integrally formed-on elements for positioning the heating bodies below the glass-ceramic plate and/or for receiving electric cords or the like. As a result, additional function elements are integrated with the plastic frame in a manner that is simple from a production standpoint.

If the heating bodies are secured directly to the glass plate, then less-stringent demands on the plastic can be made in terms of its mechanical strength. Moreover, direct heat conduction from the heating elements to the plastic frame through the securing elements can be prevented.

In accordance with again an added feature of the invention, there is provided a damping element between the plastic frame or the protective lining and the glass-ceramic plate, that embraces the glass-ceramic plate. In the event of mechanical strains and in particular impact stress on the glass-ceramic plate, the glass-ceramic plate is resiliently supported in the frame and is thus protected against breaking out.

Depending on the demands made for damping, the damping element may be simply placed below the glass plate, or it may also have a U-shaped profile that encloses the glass-ceramic and is slipped onto it.

In accordance with again an additional feature of the invention, the protective lining extends from the upper surface downward into the interior of the plastic frame. As a result, the plastic frame is additionally stabilized, so that it can withstand the strains that occur in shipping of the glass-ceramic cooktop, especially in floor-model stoves.

In accordance with a concomitant feature of the invention, the stabilization is especially successfully accomplished if the protective frame is formed of metal. However, reinforcing the plastic frame with special plastic inlays is also possible.

Other features which are considered as characteristic for the invention are set forth in the appended claims.

Although the invention is illustrated and described herein as embodied in a glass-ceramic cooktop, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
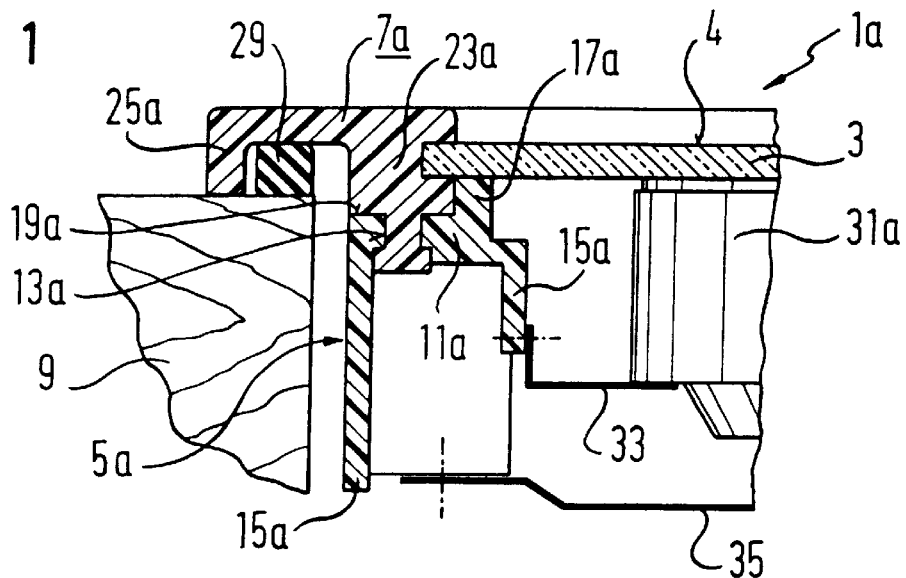
FIG. 1 is a fragmentary, diagrammatic, cross-sectional view of a glass-ceramic cooktop in accordance with a first exemplary embodiment, that is mounted on a countertop.

Referring now to the figures of the drawings in detail, it is seen that in the following description reference numerals in the six exemplary embodiments have been left the same wherever this appears expedient. Otherwise, the characteristics of the six exemplary embodiments are marked with a letter that is typical for the exemplary embodiment in question. This letter is "a" for the first exemplary embodiment and "f" for the sixth exemplary embodiment, etc.

In the first exemplary embodiment of FIG. 1, a glass-ceramic cooktop 1a has a glass-ceramic plate 3, which is known per se, having a surface 4 on which non-illustrated cooking vessels or pots can be placed for cooking purposes.

A plastic frame 5a of PA 66 material is injection molded onto the glass-ceramic plate 3, and a protective lining 7a of PPS material is injection molded onto it or onto the glass-ceramic plate 3. While PA 66 is suitable only for temperatures up to about 120° C., PPS withstands even temperature up to 300° C. without problems. The glass-ceramic cooktop 1a is mounted with the aid of the protective lining 7a on a countertop 9 or in a recess therein. The plastic frame 5a has a frame body 11a, in which injection openings 13a piercing the body 11a are provided. These openings assure a close connection between the plastic frame 5a and the protective lining 7a, when protective lining material that is then in liquid form flows through them during the injection process. Support arms 15a extend essentially downward from the frame body 11a and form elements for positioning various components of the glass-ceramic cooktop 1a. In addition, a forming arm 17a that also embraces the entire glass-ceramic plate 3 extends from the frame body 11a.

After the production of the plastic frame 5a by injection molding, the plastic frame is placed together with the glass-ceramic plate 3 in an injection mold, and the protective lining 7a is then injected. During the operation of injecting the protective lining 7a, the forming arm 17a forms a shaping boundary wall for the protective lining. The protective lining 7a that is further formed to make the frame is disposed on an upper surface 19a of the plastic frame 5a. The protective lining 7a has an enclosure body 23a and a bearing arm 25a extending toward the countertop 9 and embracing the entire glass-ceramic plate 3. By spraying the protective lining 7a onto the glass-ceramic plate 3 or the plastic frame 5a, the glass-ceramic cooktop 1a is shaped as a compact unit, and the glass-ceramic plate 3 is enclosed in a liquid-tight manner. An elastic seal 29 is additionally disposed in a receiving chamber formed between the countertop 9 and the bearing arm 25a, to prevent liquid from being able to get between the glass-ceramic cooktop 1a and the countertop 9. Radiant heating bodies 31a are secured to the support arms 15a through fastening brackets 33 or a heating well 35.

Figure 2:
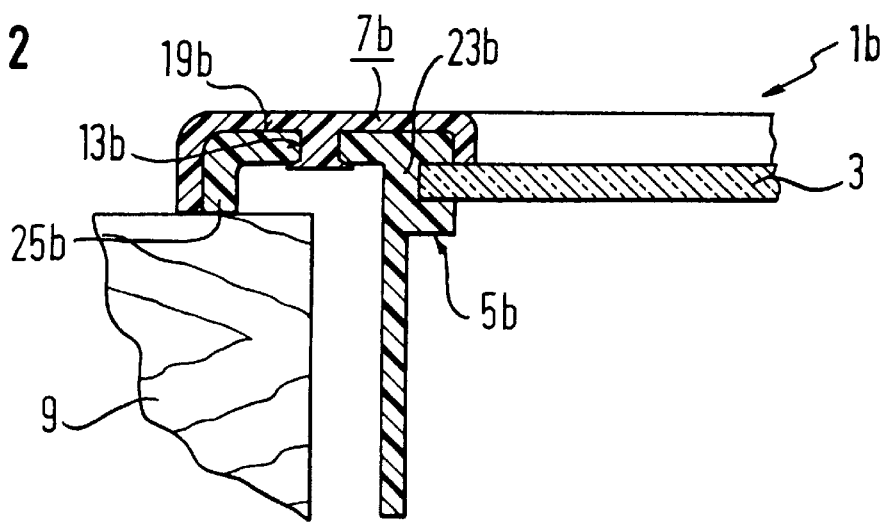
FIG. 2 is a fragmentary, cross-sectional view of a glass-ceramic cooktop in accordance with a second exemplary embodiment, that is mounted on a countertop.

In the second exemplary embodiment of FIG. 2, only the essential characteristics of a second glass-ceramic cooktop 1b that differ from the first exemplary embodiment are shown. In the second exemplary embodiment, a plastic frame 5b is injection molded onto the glass-ceramic plate 3 and has an upper surface 19b which is lined with a protective lining 7b of PPS. The injection molded plastic frame 5b, with an enclosure body 23b thereof, encloses the glass-ceramic plate as in the first exemplary embodiment. The protective lining 7b is secured to the plastic frame 5b through injection openings 13b, and the glass-ceramic cooktop 1b is mounted on or in the countertop 9 through the use of a bearing arm 25b. The protective lining 7b completely covers the upper surface 19b of the plastic frame 5b and improves the tightness of the seal between the glass-ceramic plate 3 and the plastic frame 5b. The plastic frame 5b encompasses the peripheral region of the glass-ceramic plate on its top and bottom and fits over the edge of the glass-ceramic plate 3 by approximately 3 mm.

Figure 3:
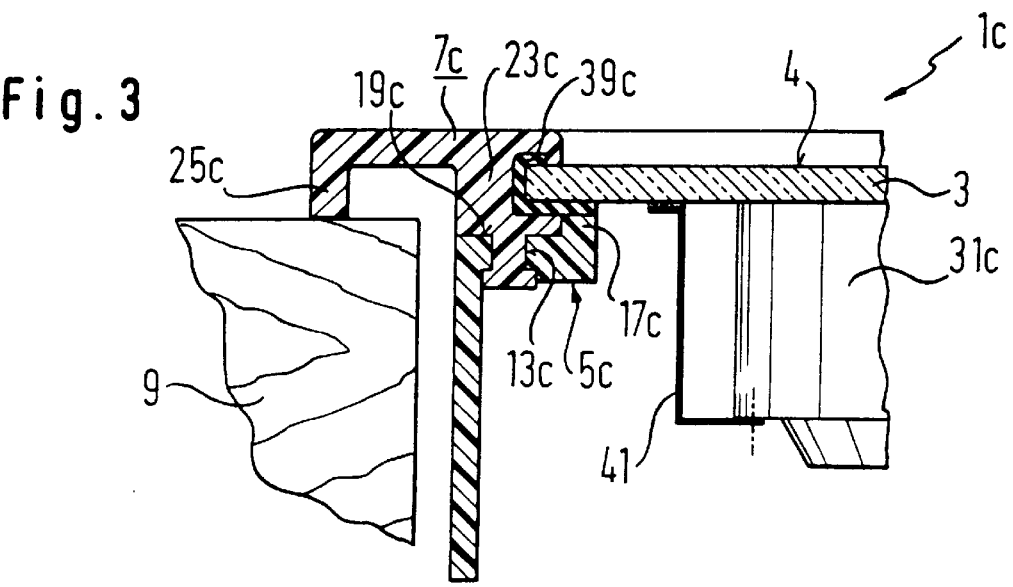
FIG. 3 is a fragmentary, cross-sectional view of a glass-ceramic cooktop in accordance with a third exemplary embodiment, that is mounted on a countertop.

In the third exemplary embodiment of FIG. 3, an elastomer damping element 39c is located between the glass-ceramic plate 3 and a plastic protective lining 7c that embraces it. The damping element 39c, which is in the form of a U-shaped profile, is first slipped onto the glass-ceramic plate 3 on its periphery and then coated with plastic by injection molding. Another modification in the third exemplary embodiment is the fastening of a radiant heating body 31c through a heating body carrier 41 glued to a lower surface of the glass-ceramic plate 3.

Figure 4:
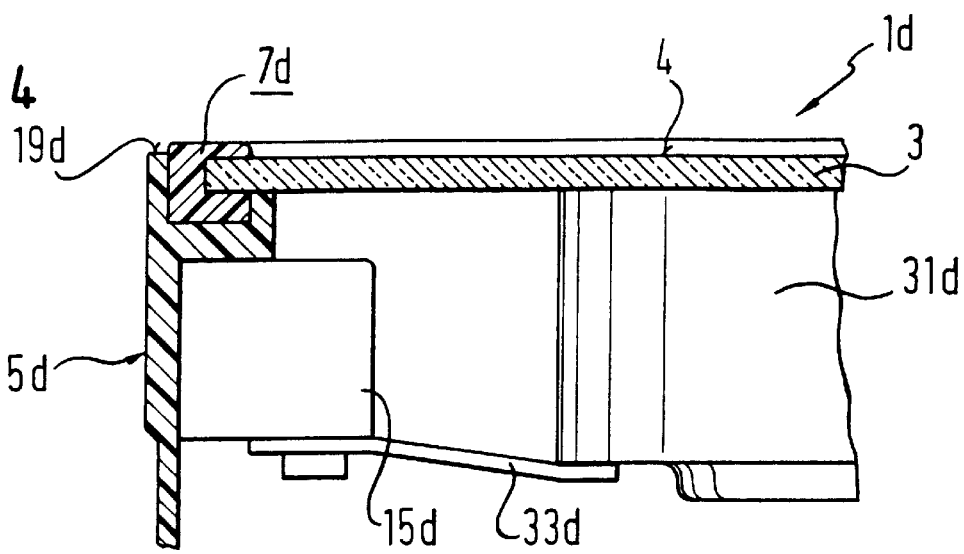
FIG. 4 is a fragmentary, cross-sectional view of a glass-ceramic cooktop in accordance with a fourth exemplary embodiment, which is suitable for a floor-model stove.

In the fourth exemplary embodiment of FIG. 4, a top-mounting glass-ceramic cooktop id for a floor-model stove is provided. A plastic frame 5d is protected through the use of a PPS protective lining 7d in the shape of a U profile which is injection molded onto the glass-ceramic plate 3. While an upper surface 19d of the plastic frame 5d is not covered by the protective lining 7d circumferentially in a small region, nevertheless, because of the existing geometry, this non-covered region is protected against direct contact with a cooking pot. A connection between the plastic frame 5d and the protective lining 7d is made by slip-mounting or snap-mounting. Alternatively, in principle the plastic frame and the protective lining can certainly be joined together by being snapped on or by a welded connection. The plastic frame 5d has integrally formed-on elements 15d for receiving electric cords or the like.

Figure 5:
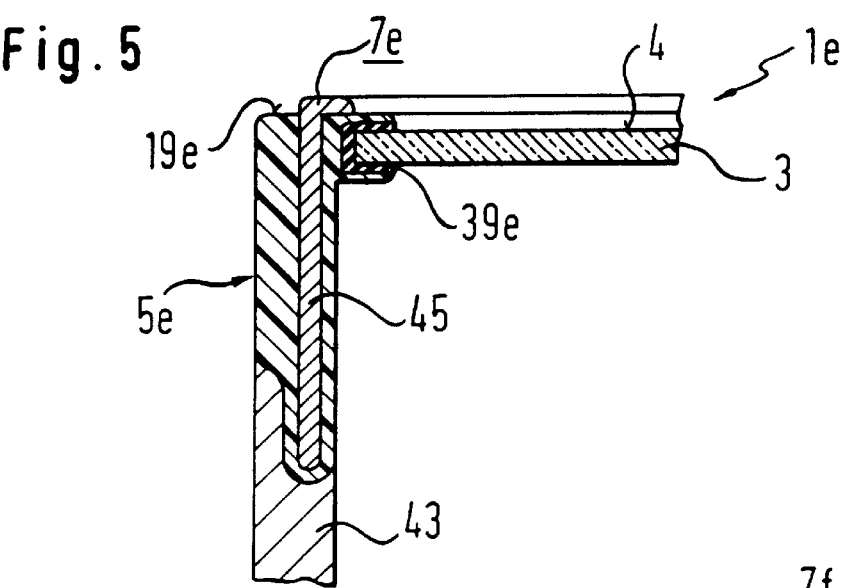
FIG. 5 is a fragmentary, cross-sectional view of a glass-ceramic cooktop in accordance with a fifth exemplary embodiment, which is suitable for a floor-model stove.

In the fifth exemplary embodiment of FIG. 5, a top-mounting glass-ceramic cooktop 1e is shown that is secured to a wall 43 of a stove. The glass-ceramic cooktop 3 is again injection molded with a plastic frame 5e, having an upper surface 19e which is protected against direct contact with a hot cooking pot by a protective lining 7e.

To that end, the protective lining 7e is constructed as a closed protective frame of stainless steel and is slipped into the plastic frame 5e and glued. The protective lining or protective frame 7e extends with a reinforcement portion 45 far into the interior of the plastic frame 5e and thus stabilizes the plastic frame over its entire height and its entire circumference.

Figure 6:
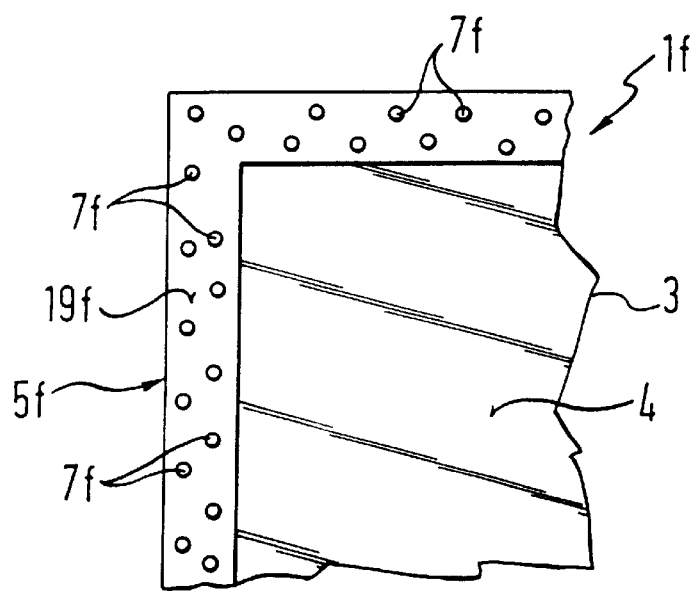
FIG. 6 is a fragmentary, plan view of a glass-ceramic cooktop in accordance with a sixth exemplary embodiment.

In the sixth exemplary embodiment of FIG. 6, a glass-ceramic cooktop 1f includes, among other elements, a glass-ceramic plate 3, which is injection molded with a plastic frame 5f. The plastic frame 5f has a PPS protective lining 7f on its upper surface 19f. This protective lining covers only a relatively small portion of the area of the plastic frame 5f. Nevertheless, the protective lining 7f protrudes upward from the upper surface 19f of the plastic frame 5f and forms protective pan rest surfaces for the plastic frame 5f. The geometry of the rest surfaces or their spacing from one another is configured in such a way that a protection of the plastic frame 5f against hot cooking pots set on it is assured. The protective pan rest surfaces can also be reduced to small metal plates secured to the plastic frame 5f.

The disclosure of the invention is not limited to the six exemplary embodiments described above. On the contrary, it is understood that any logical combinations of individual characteristics among the illustrated exemplary embodiments are also possible.

We claim:

1. A glass-ceramic cooktop, comprising:

a glass-ceramic plate having a periphery;

at least one heating body below said glass-ceramic plate;

an injection molded plastic frame embracing the periphery of said glass-ceramic plate and having an upper surface and an interior; and a protective lining of metal embracing said glass-ceramic plate and being disposed on the upper surface of said plastic frame, said protective lining extending from the upper surface of said plastic frame downward into the interior of said plastic frame.

2. The glass-ceramic cooktop according to claim 1, wherein said protective lining is formed of stainless steel.

* * * * *